(12) United States Patent
Liu et al.

(10) Patent No.: US 9,164,549 B2
(45) Date of Patent: Oct. 20, 2015

(54) ELECTRONIC DEVICE AND LOCKING MECHANISM

(75) Inventors: Ching-Min Liu, Taipei (TW); Chao-Yu Hsieh, Taipei (TW); Chih-Jung Kao, Taipei (TW); Shih-Ming Hung, Taipei (TW); Hsi-Chi Chien, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 557 days.

(21) Appl. No.: 13/454,105

(22) Filed: Apr. 24, 2012

(65) Prior Publication Data
US 2012/0268874 A1 Oct. 25, 2012

Related U.S. Application Data

(60) Provisional application No. 61/478,926, filed on Apr. 25, 2011.

(51) Int. Cl.
| | |
|---|---|
| *E05C 1/08* | (2006.01) |
| *E05C 1/04* | (2006.01) |
| *G06F 1/16* | (2006.01) |
| *E05C 1/02* | (2006.01) |
| *E05C 1/10* | (2006.01) |

(Continued)

(52) U.S. Cl.
CPC ............ *G06F 1/1656* (2013.01); *E05B 15/101* (2013.01); *E05B 65/0864* (2013.01); *E05C 1/02* (2013.01); *E05C 1/04* (2013.01); *E05C 1/08* (2013.01); *E05C 1/10* (2013.01); *G06F 1/181* (2013.01); *Y10T 403/59* (2015.01); *Y10T 403/599* (2015.01)

(58) Field of Classification Search
CPC ... E05B 15/101; E05B 65/0864; G06F 1/181; E05C 1/02; E05C 1/04; E05C 1/08; E05C 1/10
USPC ......... 292/32, 37–39, 42, 137, 138, 150, 163, 292/175, 302, DIG. 11
See application file for complete search history.

(56) References Cited

U.S. PATENT DOCUMENTS

| | | | | |
|---|---|---|---|---|
| 390,507 A | * | 10/1888 | Morton ......................... | 292/179 |
| 1,516,628 A | * | 11/1924 | Blackwell ....................... | 292/39 |

(Continued)

FOREIGN PATENT DOCUMENTS

| | | | |
|---|---|---|---|
| DE | 102006050698 | * | 5/2007 |
| TW | M300006 | | 10/2006 |
| TW | 200943286 | | 10/2009 |

OTHER PUBLICATIONS

"Office Action of Taiwan Counterpart Application", issued on Jan. 6, 2014, p. 1-p. 7.

*Primary Examiner* — Carlos Lugo
(74) *Attorney, Agent, or Firm* — Jianq Chyun IP Office (57) ABSTRACT

An electronic device including a main body, a shell and a locking mechanism is provided. The locking mechanism includes a first locking component and at least one second locking component. The first locking component is slidably disposed at the main body, locks the shell and has at least one retaining portion. The second locking component is slidably disposed at the main body and locks the shell. The retaining portion blocks the second locking component from sliding relatively to the main body. When the first locking component slides relatively to the main body to release the shell, the retaining portion moves away from the second locking component and the second locking component slides relatively to the main body to release the shell.

18 Claims, 10 Drawing Sheets

(51) Int. Cl.
*E05B 15/10* (2006.01)
*E05B 65/08* (2006.01)
*G06F 1/18* (2006.01)

(56) References Cited

U.S. PATENT DOCUMENTS

| | | | | |
|---|---|---|---|---|
| 2,878,389 | A * | 3/1959 | Raffman | 378/188 |
| 3,003,202 | A * | 10/1961 | Mendelsohn | 49/503 |
| 4,179,143 | A * | 12/1979 | Shy | 292/179 |
| 4,204,724 | A * | 5/1980 | Bauer et al. | 396/522 |
| 4,547,006 | A * | 10/1985 | Castanier | 292/37 |
| 4,746,152 | A * | 5/1988 | Willcox | 292/150 |
| 5,076,015 | A * | 12/1991 | Manzalini | 49/192 |
| 5,092,637 | A * | 3/1992 | Miller | 292/173 |
| 7,420,799 | B2 * | 9/2008 | Wang | 361/679.27 |
| 7,793,312 | B2 * | 9/2010 | Yang | 720/610 |
| 8,267,464 | B2 * | 9/2012 | Konchan et al. | 296/146.6 |
| 8,328,246 | B2 * | 12/2012 | Zhang et al. | 292/32 |
| 8,360,485 | B2 * | 1/2013 | Ma et al. | 292/333 |
| 8,414,037 | B2 * | 4/2013 | Wang et al. | 292/163 |
| 8,424,932 | B2 * | 4/2013 | Xu et al. | 292/163 |
| 8,424,933 | B2 * | 4/2013 | Xu et al. | 292/163 |
| 2006/0207182 | A1 * | 9/2006 | Van Parys | 49/192 |

* cited by examiner

ELECTRONIC DEVICE AND LOCKING MECHANISM

CROSS-REFERENCE TO RELATED APPLICATION

This application claims the priority benefits of U.S. provisional application Ser. No. 61/478,926, filed on Apr. 25, 2011. The entirety of the above-mentioned patent application is hereby incorporated by reference herein and made a part of this specification.

BACKGROUND OF THE INVENTION

1. Field of the Invention

The invention generally relates to an electronic device and a locking mechanism thereof, and more particularly, to an electronic device with a detachable shell and a locking mechanism thereof.

2. Description of Related Art

Along with development of semiconductor devices and display techniques, electronic products have been continually developed toward miniaturization, multi-functionality, and portability. The common portable electronic products include notebook computers, tablet computers, mobile phones, etc. In recent years, the portable electronic products, in addition to a substantial evolution in function, are also increasingly focused on the appearance design, such that the appearance of the portable electronic products becomes an important factor to influence the purchase intentions of the consumers.

In order to allow the portable electronic products having variable appearances, some of portable electronic products have a replaceable shell by design. Taking a notebook computer as an example, the back shell of the display thereof is detachable by design, which allows the user self to replace the shell with different color or pattern. However, when the user wants to replace the described shell, the user is often required to respectively unlock multiple locking elements between the shell and the display, or to use a screw driver to take off the screws for fastening the shell, and therefore, the above-mentioned scheme is quite inconvenient to detach off the shell.

SUMMARY OF THE INVENTION

Accordingly, the invention is directed to an electronic device, wherein the shell thereof is convenient to be detached.

The invention is also directed to a locking mechanism providing the electronic device with shell-detaching convenience.

The invention provides an electronic device, which includes a main body, a shell and a locking mechanism. The shell covers the main body. The locking mechanism includes a first locking component and at least one second locking component. The first locking component is slidably disposed at the main body, locks the shell and has at least one retaining portion. The second locking component is slidably disposed at the main body and locks the shell, in which the retaining portion blocks the second locking component from sliding relatively to the main body, when the first locking component slides relatively to the main body to release the shell, the retaining portion moves away from the second locking component and the second locking component slides relatively to the main body to release the shell.

The invention provides a locking mechanism suitable for an electronic device, which includes a main body and a shell. The shell covers the main body. The locking mechanism includes a first locking component and at least one second locking component. The first locking component is slidably disposed at the main body, locks the shell and has at least one retaining portion. The second locking component is slidably disposed at the main body and locks the shell, in which the retaining portion blocks the second locking component from sliding relatively to the main body, when the first locking component slides relatively to the main body to release the shell, the retaining portion moves away from the second locking component and the second locking component slides relatively to the main body to release the shell.

In an embodiment of the present invention, the above-mentioned locking mechanism further includes an elastic component connected between the first locking component and the main body, in which when the first locking component slides relatively to the main body to release the shell, the elastic component stores an elastic potential energy.

In an embodiment of the present invention, the above-mentioned locking mechanism further includes an elastic component connected between the second locking component and the main body, in which when the retaining portion moves away from the second locking component, the second locking component slides relatively to the main body by the elastic force of the elastic component to release the shell.

In an embodiment of the present invention, the above-mentioned first locking component is slidably disposed at the main body in a first direction, the second locking component is slidably disposed at the main body in a second direction, and the first direction is perpendicular to the second direction.

In an embodiment of the present invention, the quantity of the above-mentioned at least one second locking component is two, which are respectively adjacent to the two opposite side-edges of the main body; the quantity of the at least one retaining portion is two, which are respectively located at two opposite ends of the first locking component.

In an embodiment of the present invention, the above-mentioned first locking component has a notch, the notch is adjacent to the retaining portion, when the second locking component slides relatively to the main body to release the shell, one end of the second locking component inserts into the notch.

In an embodiment of the present invention, the above-mentioned first locking component has at least one slot, the shell has at least one hook, the hook goes through the slot to lock the first locking component, when the first locking component slides relatively to the main body, the hook moves along the slot relatively to the first locking component.

In an embodiment of the present invention, the above-mentioned second locking component has at least one slot, the shell has at least one hook, the hook goes through the slot to lock the second locking component, when the second locking component slides relatively to the main body, the hook moves along the slot relatively to the second locking component.

In an embodiment of the present invention, the above-mentioned second locking component has a guiding inclined plane, and the second locking component slides relatively to the main body through the guiding action of the guiding inclined plane.

In an embodiment of the present invention, the above-mentioned further includes a pushing component, disposed between the main body and the shell, in which when the first locking component and the second locking component release the shell, the shell separates from the main body through the pushing action of the pushing component.

In an embodiment of the present invention, the above-mentioned pushing component is an elastic component, when both the first locking component and the second locking component release the shell, the shell is pushed away from the main body through the elastic force of the elastic component.

Based on the description above, when the first locking component of the invention slides relatively to the main body to release the shell, the first locking component simultaneously brings the retaining portions moving away from the second locking components so that the second locking components are not position-limited anymore by the retaining portions and slide relatively to the main body to release the shell. Thus, when the user wants to detach the shell from the main body of the electronic device, the user needs only to make the first locking component slide, so that both the first locking component and the second locking components simultaneously unlock the shell, which is convenient to detach the shell.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
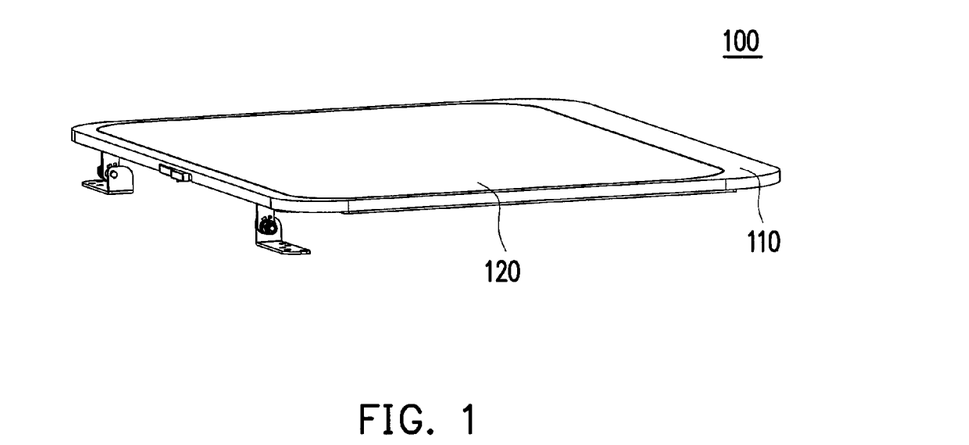
FIG. 1 is a three-dimensional diagram of an electronic device according to an embodiment of the invention.

FIG. 1 is a three-dimensional diagram of an electronic device according to an embodiment of the invention. Referring to FIG. 1, an electronic device 100 of the embodiment is, for example, a display module of a notebook computer and includes a main body 110 and a shell 120. The shell 120 is, for example, a decorate shell and covers the main body 110. In the embodiment, the shell 120 is detachable by design, which allows the user self replace shells with different colors or patterns on the main body 110. In other embodiments, the electronic device 100 can be other kinds of electronic products, which the invention is not limited to.

Figure 2:
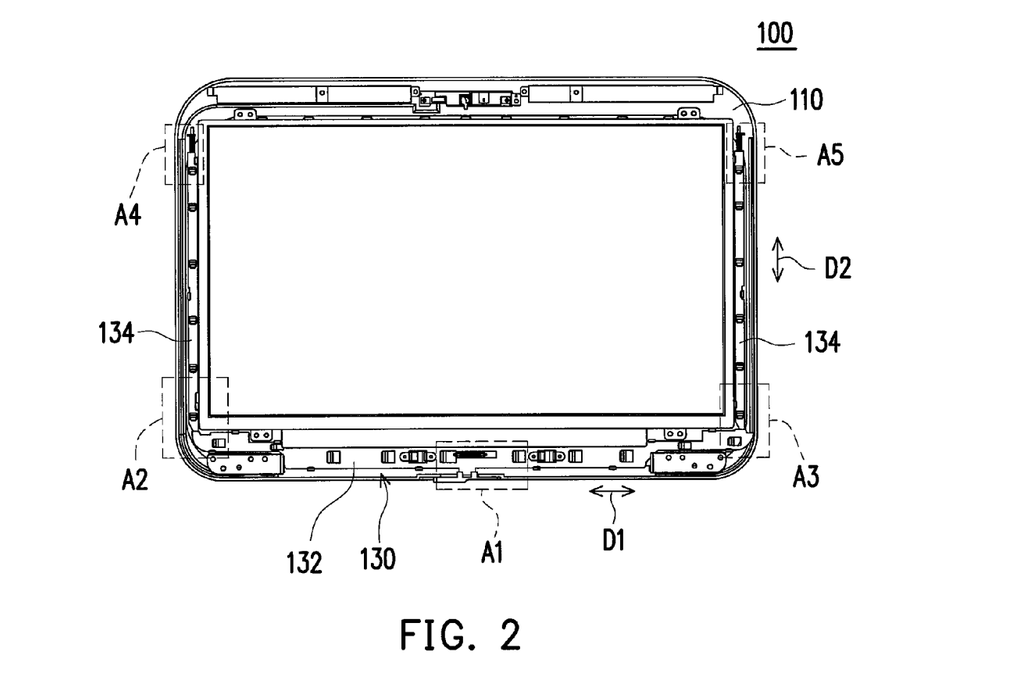
FIG. 2 is a bottom-view diagram of the electronic device of FIG. 1.
Figure 3A:
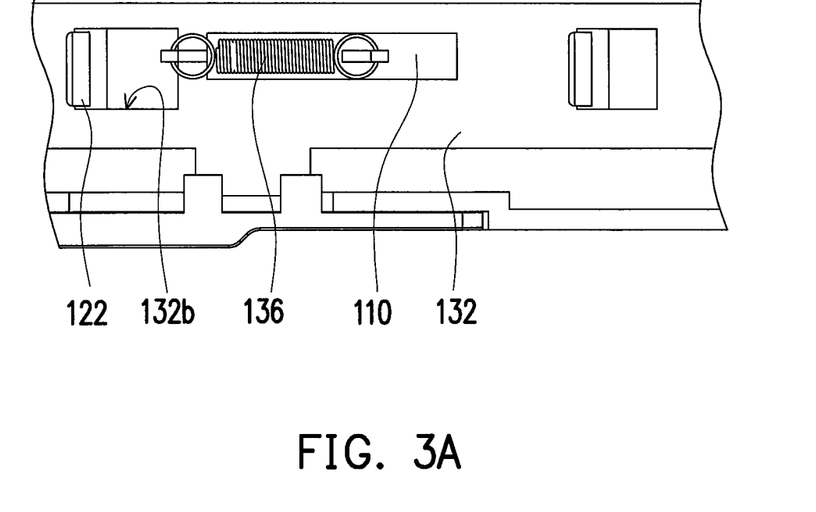
FIGS. 3A-3E are respectively enlarged diagrams of the areas A1-A5 in FIG. 2.
Figure 3B:
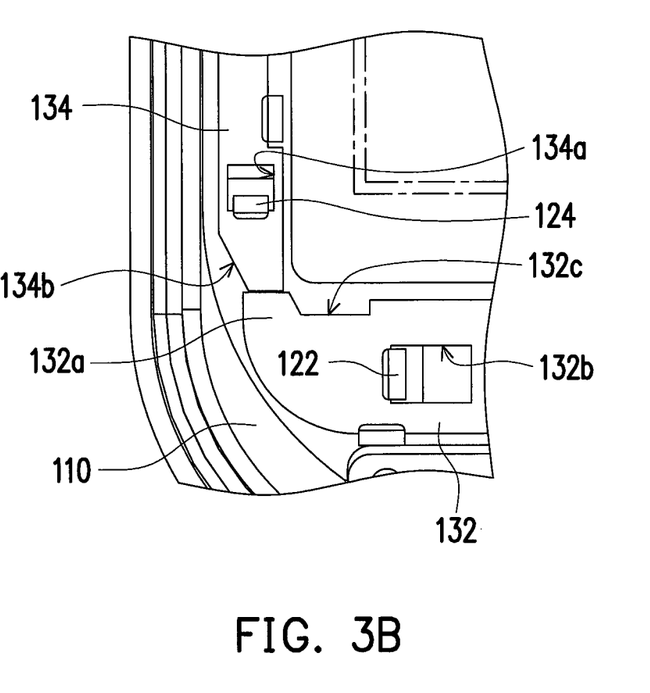
Figure 3C:
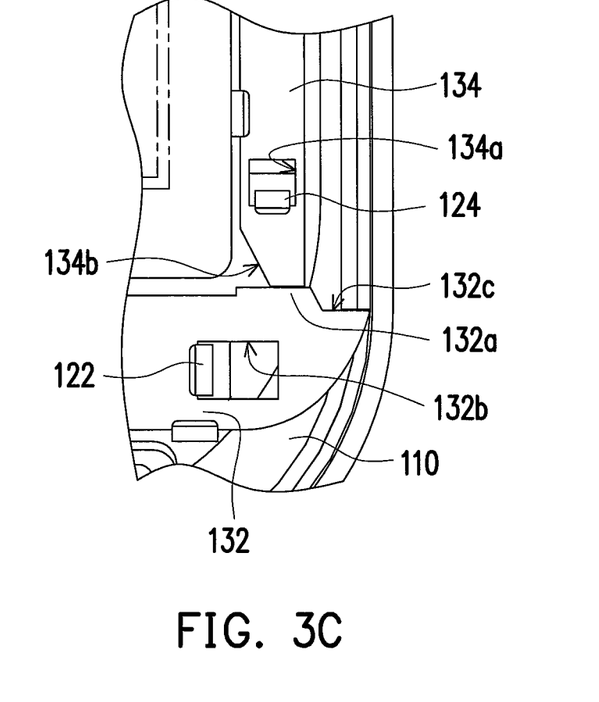

FIG. 2 is a bottom-view diagram of the electronic device of FIG. 1 and FIGS. 3A-3E are respectively enlarged diagrams of the areas A1-A5 in FIG. 2. Referring to FIG. 2, the electronic device 100 further includes a locking mechanism 130. The locking mechanism 130 includes a first locking component 132 and at least one second locking component 134 (two ones are shown in the figure). The first locking component 132 is slidably disposed at the main body 110 in a first direction D1 and locks the shell 120 shown by FIG. 1. As shown by FIGS. 3B and 3C, the first locking component 132 has two retaining portions 132a, and each of the second locking components 134 is slidably disposed at the main body 110 in a second direction D2 perpendicular to the first direction D1 and locks the shell 120 shown by FIG. 1. The two second locking components 134 are respectively adjacent to the two opposite side-edges of the main body 110. The two retaining portions 132a are respectively located at the two opposite ends of the first locking component 132 and respectively corresponding to the two second locking components 134, in which each of the retaining portions 132a blocks the corresponding second locking component 134 from sliding relatively to the main body 110.

Figure 4:
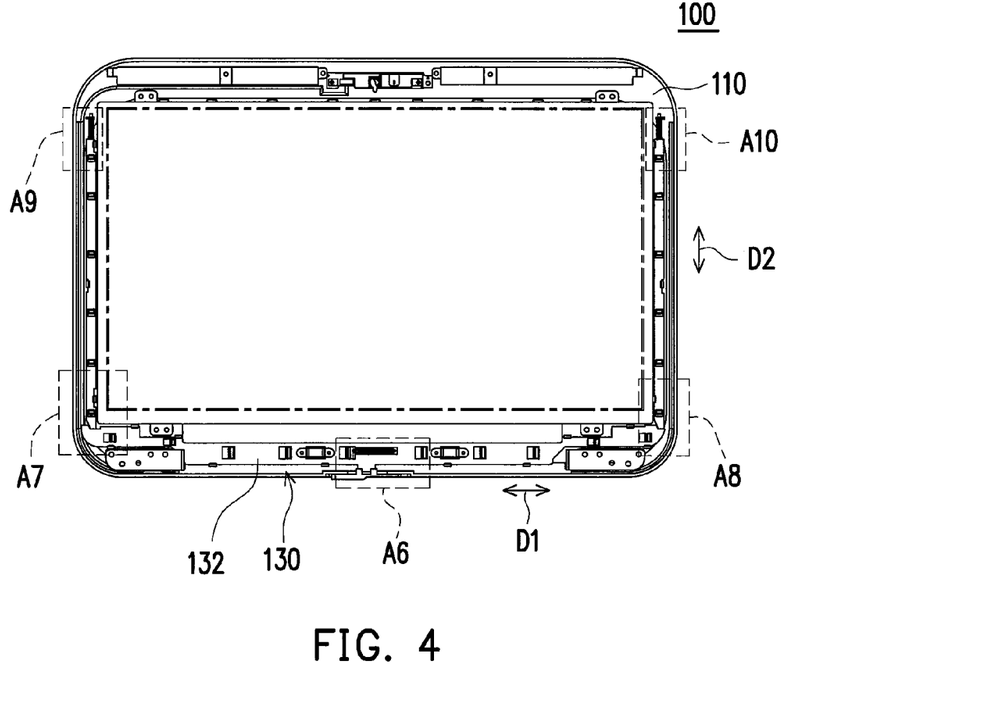
FIG. 4 is a diagram showing the action of the locking mechanism of FIG. 2.
Figure 5A:
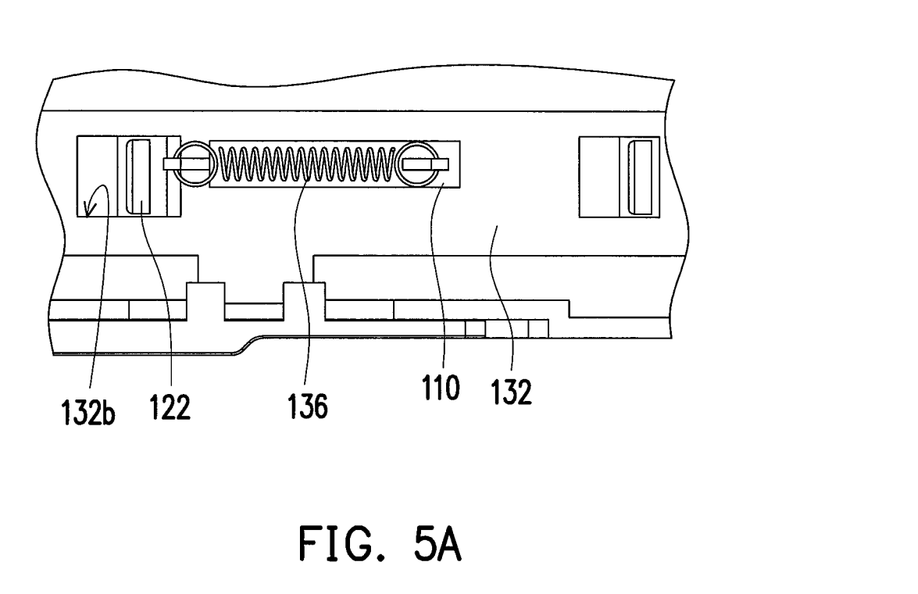
FIGS. 5A-5E are respectively enlarged diagrams of the areas A6-A10 in FIG. 3.
Figure 5B:
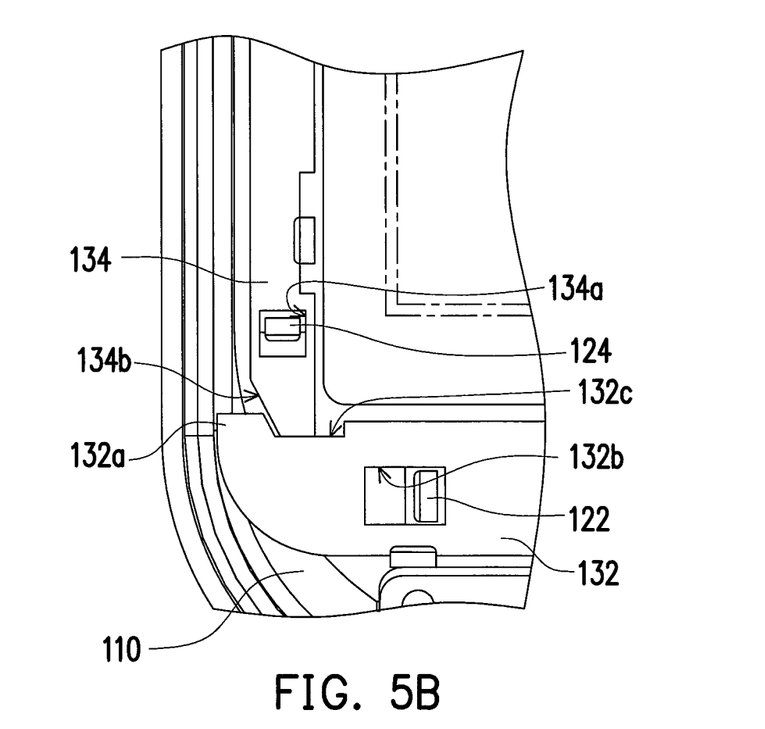
Figure 5C:
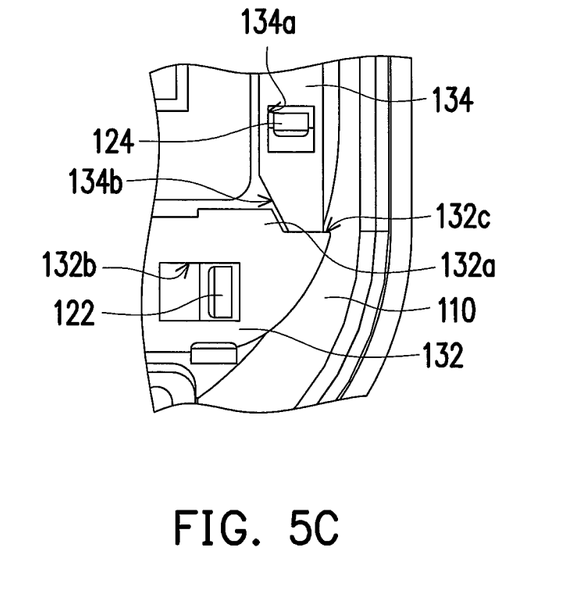
Figure 5D:
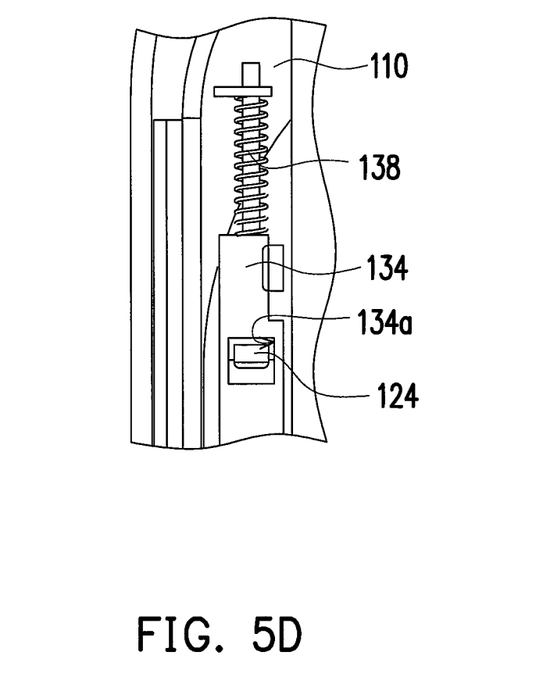
Figure 5E:
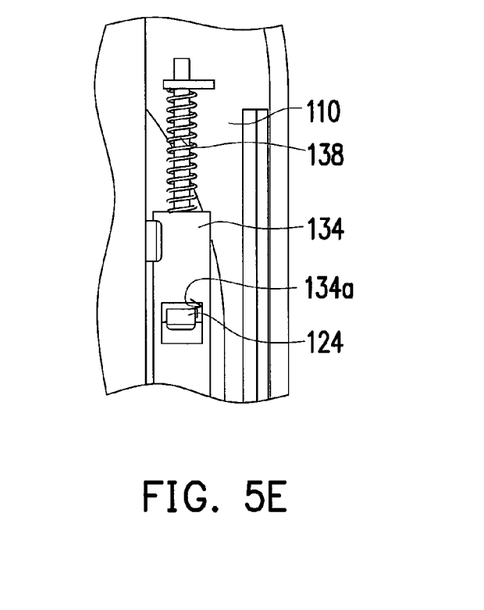

FIG. 4 is a diagram showing the action of the locking mechanism of FIG. 2 and FIGS. 5A-5E are respectively enlarged diagrams of the areas A6-A10 in FIG. 3. When the first locking component 132 slides relatively to the main body 110 from the position shown by FIG. 2 to the position of FIG. 4 to release the shell 120, each of the retaining portions 132a would move away from the corresponding second locking component 134 as shown by FIGS. 5B and 5C, and each of the second locking components 134 slides relatively to the main body 110 from the position shown by FIG. 2 to the position of FIG. 4 so as to release the shell 120.

In the above-mentioned layout, when the first locking component 132 slides relatively to the main body 110 to release the shell 120, the first locking component 132 simultaneously brings all the retaining portions 132a moving away from the corresponding second locking components 134, so that each of the second locking components 134 is no longer position-limited by the corresponding retaining portion 132a and slides relatively to the main body 110 to release the shell 120. In this way, when the user wants to detach the shell 120 from the main body 110 of the electronic device 100, the user needs only to make the first locking component 132 slide, so that both the first locking component 132 and the second locking components 134 simultaneously unlock the shell 120, which is convenient to detach the shell 120.

After the user finishes replacing the shell, the force applied onto the first locking component 132 is terminated, so that the first locking component 132 resumes its original position through the elastic force of an elastic component 136 from the position shown by FIG. 4 to the position of FIG. 2. At the time, the second locking components 134 no longer blocked by the retaining portions 132a would simultaneously resume their original positions through the elastic forces of the elastic components 136 from the position shown by FIG. 4 to the position of FIG. 2, so that the first locking component 132 and the second locking components 134 lock the shell once again.

Figure 3D:
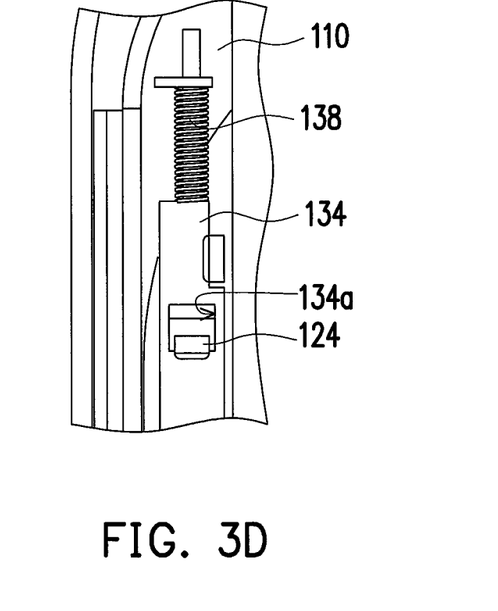
Figure 3E:
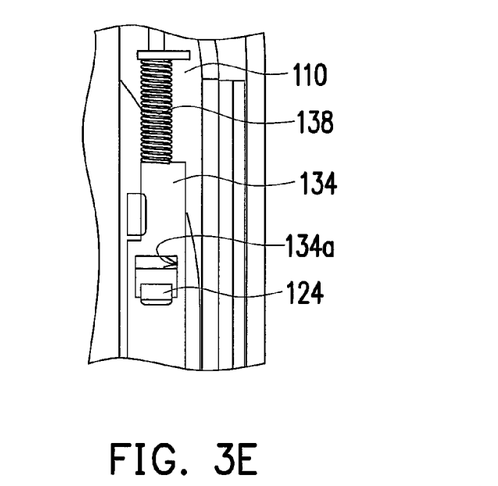

Referring to FIGS. 2 and 3A, in the embodiment, the first locking component 132 has at least one slot 132b (multiple ones are shown in the figure) and the shell 120 (shown in FIG. 1) has at least one hook 122 (multiple ones are shown in the figure). The hooks 122 respectively go through the slots 132b to lock the first locking component 132. When the first locking component 132 slides relatively to the main body 110 as shown by FIG. 4, each of the hooks 122 moves along the corresponding slot 132b relatively to the first locking component 132 (shown in FIG. 5A) to release the locking between the first locking component 132 and the shell 120. Referring to FIGS. 2, 3D and 3E, each of the second locking components 134 has at least one slot 134a (multiple ones are shown in the figure) and the shell 120 (shown in FIG. 1) has at least one hook 124 (multiple ones are shown in the figure). The hooks 124 respectively go through the slots 134*a* to lock the second locking components 134. When each of the second locking component 134 slides relatively to the main body 110 as shown by FIG. 4, each of the hooks 124 moves along the corresponding slot 134*a* relatively to the corresponding second locking component 134 (shown in FIGS. 5D and 5E) to release the locking between each of the second locking components 134 and the shell 120.

Referring to FIG. 3A again, the locking mechanism 130 in the embodiment further includes an elastic component 136. The elastic component 136 is connected between the first locking component 132 and the main body 110. When the first locking component 132 slides relatively to the main body 110 (shown in FIG. 4) to release the shell 120 (shown in FIG. 1), the elastic component 136 stores an elastic potential energy so that the first locking component 132 can automatically resume its original position through the elastic force of the elastic component 136. In addition, referring to FIGS. 3D and 3E, the locking mechanism 130 further includes two elastic components 138. Each of the elastic components 138 is connected between the corresponding second locking component 134 and the main body 110. When each of the retaining portions 132*a* moves away from the corresponding second locking components 134 as shown by FIGS. 3B and 3C, each of the second locking components 134 would slide relatively to the main body 110 to release the shell 120 through the elastic force of the corresponding elastic component 138 (shown in FIG. 1).

Referring to FIGS. 3B and 3C, in the embodiment, the first locking component 132 has two notches 132*c*, the notches 132*c* are respectively adjacent to the two retaining portions 132*a*. When the second locking components 134 slide (shown in FIG. 4) relatively to the main body 110 to release the shell 120 (shown in FIG. 1), an end of each of the second locking components 134 would insert into the corresponding notch 132*c* as shown by FIGS. 5B and 5C. In other words, each of the notches 132*c* provides the corresponding second locking component 134 with a moving space, so that each of the second locking components 134 can move relatively to the main body 110. In addition, each of the second locking components 134 in the embodiment has a guiding inclined plane 134*b*, through which the second locking component 134 can slide relatively to the main body 110.

Figure 6:
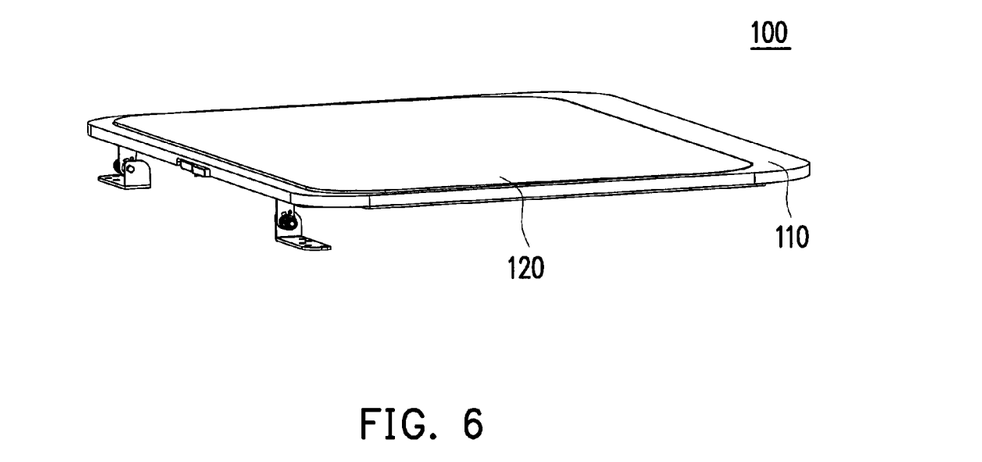
FIG. 6 is a diagram showing the shell of FIG. 2 pops up from the main body.
Figure 7:
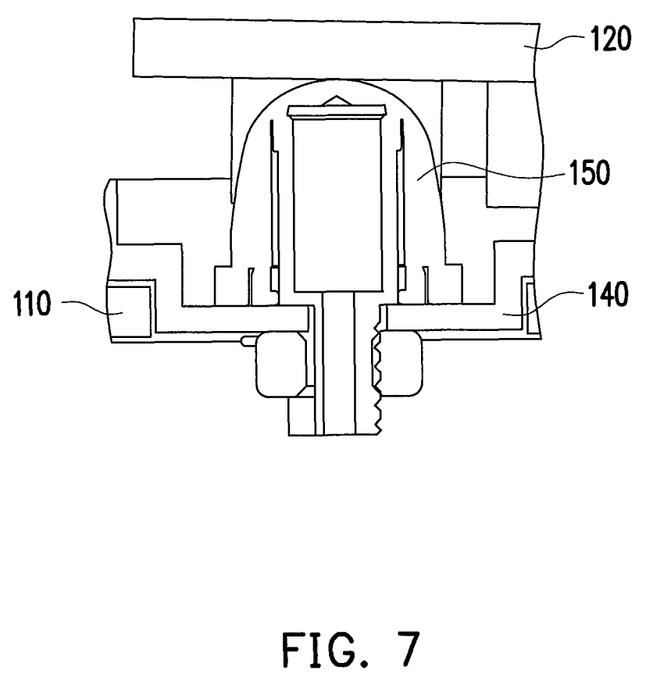
FIG. 7 is a partial cross-sectional diagram of the electronic device of FIG. 6.

FIG. 6 is a diagram showing the shell of FIG. 2 pops up from the main body and FIG. 7 is a partial cross-sectional diagram of the electronic device of FIG. 6. Referring to FIGS. 6 and 7, the electronic device 100 of the embodiment further includes a pushing component 140 disposed between the main body 110 and the shell 120. When the first locking component 132 and the second locking components 134 are in the state shown by FIG. 4 to release the shell 120, the shell 120 would pops up to separate from the main body 110 through the pushing action of the pushing component 140 as shown by FIGS. 6 and 7, which allows the user conveniently detach the shell 120 for replacement. In more details, the pushing component 140 of the embodiment is, for example, an elastic component in spring-arm form. A pushing part 150 is disposed on the pushing component 140 and the pushing part 150 is suitable to lift up the shell 120 through the elastic force of the pushing component 140, and the invention does not limit the structure of the pushing component 140 and the pushing component 140 can be understood in following through the exemplary implementation and figures.

Figure 8:
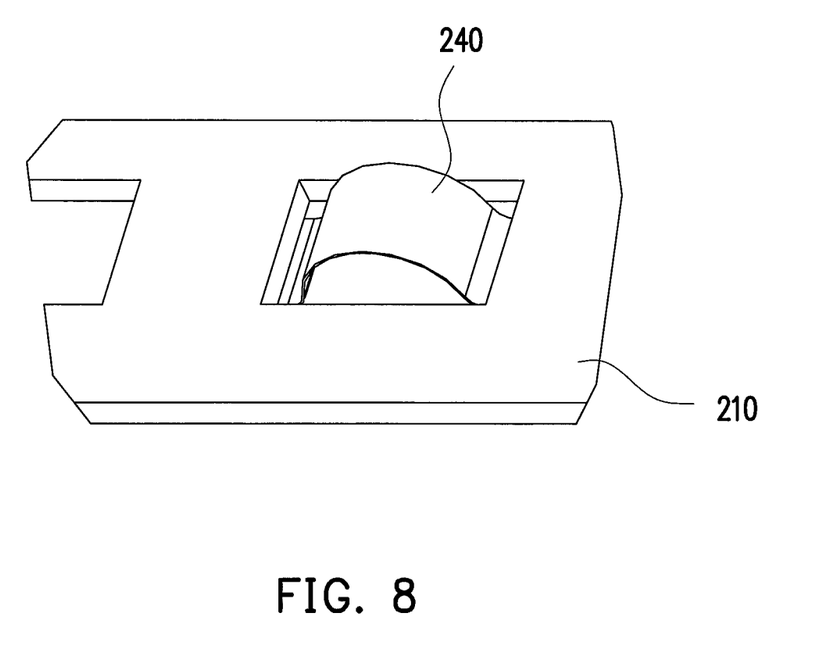
FIG. 8 is a partial three-dimensional diagram of the main body of an electronic device according to another embodiment of the invention.
Figure 9:
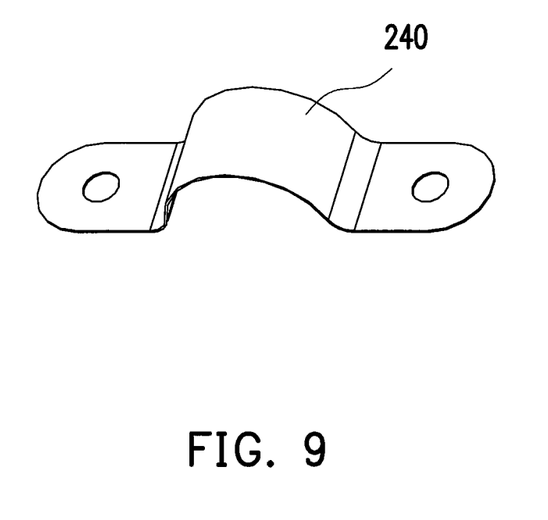
FIG. 9 is a three-dimensional diagram of the pushing component of FIG. 8.

FIG. 8 is a partial three-dimensional diagram of the main body of an electronic device according to another embodiment of the invention and FIG. 9 is a three-dimensional diagram of the pushing component of FIG. 8. Referring to FIGS. 8 and 9, in the embodiment, the pushing component 240 is, for example, an elastic component in spring-sheet form disposed on the main body 210 and the pushing component 240 is suitable to pop up the shell from the main body 210 through the elastic force of the pushing component 240.

Figure 10A:
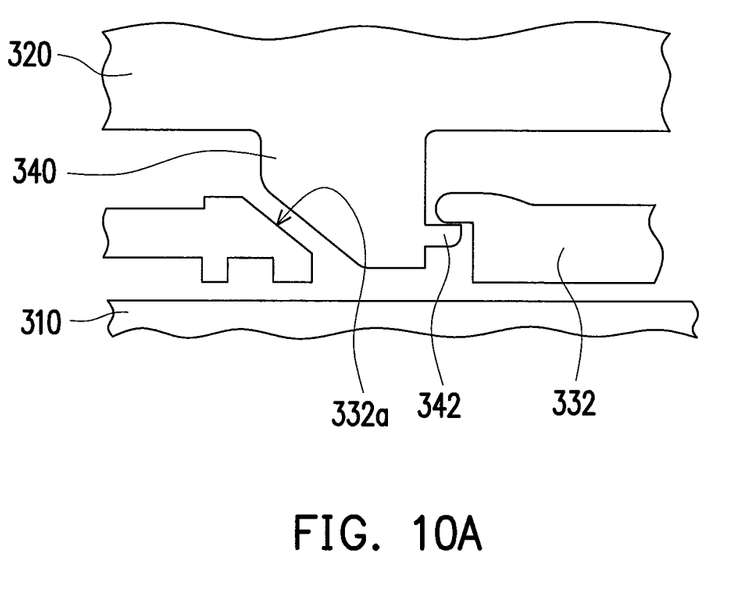
FIG. 10A is a partial diagram of an electronic device according to yet another embodiment of the invention.
Figure 10B:
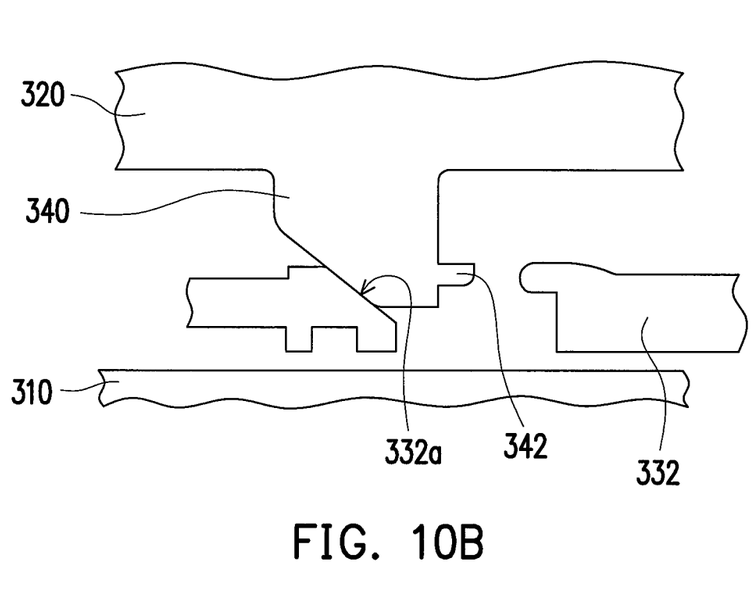
FIG. 10B is a diagram showing the shell of FIG. 10A pops up from the main body.

FIG. 10A is a partial diagram of an electronic device according to yet another embodiment of the invention and FIG. 10B is a diagram showing the shell of FIG. 10A pops up from the main body. Similar to the FIGS. 1 and 2, where the shell 120 covers the main body 110 and the first locking component 132 is slidably disposed at the main body 110, in FIG. 10A, the shell 320 covers the main body 310 and the first locking component 332 is slidably disposed at the main body 310. The unique of the embodiment of FIG. 10A from the embodiment of FIGS. 1 and 2 rests in the pushing component 340 of the embodiment is a partial structure of the shell 320 and has a hook 342. The shell 320 is locked at the first locking component 332 through the hook 342 of the pushing component 340. When the first locking component 332 slides relatively to the main body 310 from the position shown by FIG. 10A to the position of FIG. 10B, the locking between the hook 342 and the first locking component 332 is released and the inclined surface 332*a* of the first locking component 332 pushes the pushing component 340 away from the main body 310, so that the shell 320 is popped up from the main body 310 to separate from the main body 310 through the pushing action of the pushing component 340.

In summary, when the first locking component of the invention slides relatively to the main body to release the shell, the first locking component simultaneously brings the retaining portions moving away from the second locking components so that the second locking components are not position-limited anymore by the retaining portions and slide relatively to the main body through the elastic forces of the elastic components to release the shell. Thus, when the user wants to detach the shell from the main body of the electronic device, the user needs only to make the first locking component slide, so that both the first locking component and the second locking components simultaneously unlock the shell, which is convenient to detach the shell.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:
1. An electronic device, comprising:
a main body;
a shell, covering the main body; and
a locking mechanism, comprising:
    a first locking component, slidably disposed at the main body, locking the shell and having two retaining portions;
    two second locking components, slidably disposed at the main body and locking the shell; and
two elastic components, each of the elastic components is connected between each of the second locking components and the main body, wherein the retaining portion blocks the second locking components from sliding relatively to the main body, and when a user makes the first locking component slide relatively to the main body to release the shell, the retaining portions move away from the second locking components along a same direction and the second locking components slide relatively to the main body by the elastic force of the elastic components to release the shell.

2. The electronic device as claimed in claim 1, wherein the locking mechanism further comprises another elastic component connected between the first locking component and the main body, wherein when the first locking component slides relatively to the main body to release the shell, the another elastic component stores an elastic potential energy.

3. The electronic device as claimed in claim 1, wherein the first locking component is slidably disposed at the main body in a first direction, each of the second locking components is slidably disposed at the main body in a second direction, and the first direction is perpendicular to the second direction.

4. The electronic device as claimed in claim 1, wherein the second locking components are respectively adjacent to the two opposite side-edges of the main body; and the retaining portions are respectively located at two opposite ends of the first locking component.

5. The electronic device as claimed in claim 1, wherein the first locking component has two notches, the notches are adjacent to the retaining portions respectively, and when the second locking components slide relatively to the main body to release the shell, one end of each of the second locking components inserts into each of the notches.

6. The electronic device as claimed in claim 1, wherein the first locking component has at least one slot, the shell has at least one hook, the hook goes through the slot to lock the first locking component, and when the first locking component slides relatively to the main body, the hook moves along the slot relatively to the first locking component.

7. The electronic device as claimed in claim 1, wherein each of the second locking components has at least one slot, the shell has at least one hook, the hook goes through the slot to lock each of the second locking components, and when each of the second locking components slides relatively to the main body, the hook moves along the slot relatively to each of the second locking components.

8. The electronic device as claimed in claim 1, wherein each of the second locking components has a guiding inclined plane, and each of the second locking components slides relatively to the main body through the guiding action of the guiding inclined plane.

9. The electronic device as claimed in claim 1, further comprising a pushing component, disposed between the main body and the shell, wherein when the first locking component and the second locking components release the shell, the shell separates from the main body through the pushing action of the pushing component.

10. The electronic device as claimed in claim 9, wherein the pushing component is an elastic component, and when the first locking component and the second locking components release the shell, the shell is pushed away from the main body through the elastic force of the elastic component.

11. A locking mechanism, suitable for an electronic device, wherein the electronic device comprises a main body and a shell, the shell covers the main body and the locking mechanism comprises:

a first locking component, slidably disposed at the main body, locking the shell and having two retaining portions;

two second locking components, slidably disposed at the main body and locking the shell; and two elastic components, each of the elastic components is connected between each of the second locking components and the main body, wherein the retaining portion blocks the second locking components from sliding relatively to the main body, and when a user makes the first locking component slide relatively to the main body to release the shell, the retaining portions move away from the second locking components along a same direction and the second locking components slide relatively to the main body by the elastic force of the elastic components to release the shell.

12. The locking mechanism as claimed in claim 11, further comprising another elastic component connected between the first locking component and the main body, wherein when the first locking component slides relatively to the main body to release the shell, the another elastic component stores an elastic potential energy.

13. The locking mechanism as claimed in claim 11, wherein the first locking component is slidably disposed at the main body in a first direction, each of the second locking components is slidably disposed at the main body in a second direction, and the first direction is perpendicular to the second direction.

14. The locking mechanism as claimed in claim 11, wherein the second locking components are respectively adjacent to the two opposite side-edges of the main body; and the retaining portions are respectively located at two opposite ends of the first locking component.

15. The locking mechanism as claimed in claim 11, wherein the first locking component has two notches, the notches are adjacent to the retaining portions respectively, and when the second locking components slide relatively to the main body to release the shell, one end of each of the second locking components inserts into each of the notches.

16. The locking mechanism as claimed in claim 11, wherein the first locking component has at least one slot, the shell has at least one hook, the hook goes through the slot to lock the first locking component, and when the first locking component slides relatively to the main body, the hook moves along the slot relatively to the first locking component.

17. The locking mechanism as claimed in claim 11, wherein each of the second locking components has at least one slot, the shell has at least one hook, the hook goes through the slot to lock each of the second locking components, and when each of the second locking components slides relatively to the main body, the hook moves along the slot relatively to each of the second locking components.

18. The locking mechanism as claimed in claim 11, wherein each of the second locking components has a guiding inclined plane, and each of the second locking components slides relatively to the main body through the guiding action of the guiding inclined plane.

* * * * *